United States Patent
Gerhardt et al.

(10) Patent No.: US 9,033,395 B2
(45) Date of Patent: May 19, 2015

(54) MOTOR VEHICLE SIDE DOOR

(71) Applicant: FORD GLOBAL TECHNOLOGIES, LLC, Dearborn, MI (US)

(72) Inventors: Torsten Gerhardt, London (GB); Jose Paris, London (GB); Martin Lichter, Erftstadt (DE); Martin Knuettel, Cologne (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/320,787

(22) Filed: Jul. 1, 2014

(65) Prior Publication Data
US 2015/0028620 A1    Jan. 29, 2015

(30) Foreign Application Priority Data
Jul. 29, 2013    (GB) .................................. 1313459.8

(51) Int. Cl.
| | | |
|---|---|---|
| *B60J 1/08* | (2006.01) | |
| *B60J 1/10* | (2006.01) | |
| *B60J 1/17* | (2006.01) | |
| *B60J 5/04* | (2006.01) | |
| *B60J 10/04* | (2006.01) | |
| *E06B 5/00* | (2006.01) | |
| *E06B 7/16* | (2006.01) | |
| *B60J 1/00* | (2006.01) | |

(52) U.S. Cl.
CPC *B60J 5/0402* (2013.01); *B60J 5/04* (2013.01); *B60J 5/0411* (2013.01); *B60J 10/041* (2013.01); *E06B 5/00* (2013.01); *E06B 7/16* (2013.01); *B60J 10/04* (2013.01); *B60J 1/008* (2013.01); *B60J 1/10* (2013.01); *B60J 1/17* (2013.01)

(58) Field of Classification Search
CPC .............. B60J 1/001; B60J 1/008; B60J 1/10; B60J 1/12; B60J 1/14; B60J 1/16; B60J 1/17; B60J 5/0401; B60J 5/0402; B60J 5/0405; B60J 5/0406; B60J 5/0408; B60J 5/0409; B60J 5/0411
USPC ..................... 296/146.1, 146.2, 146.3; 49/502
See application file for complete search history.

(56) References Cited

U.S. PATENT DOCUMENTS 4,473,252 A * 9/1984 Tomforde et al. .......... 296/146.2
4,988,142 A     1/1991 Chandler et al.
(Continued)

FOREIGN PATENT DOCUMENTS

| GB | 415947 A | 9/1934 |
|---|---|---|
| GB | 2089738 A | 6/1982 |
| WO | 2010080895 A1 | 7/2010 |

OTHER PUBLICATIONS

Search Report for British Patent Application No. GB1313459.8 dated Jan. 26, 2014.

*Primary Examiner* — Gregory Blankenship
(74) *Attorney, Agent, or Firm* — Jason Rogers; King & Schickli, PLLC

(57) ABSTRACT

A motor vehicle having a side door is disclosed having lower and upper parts. The upper part comprises a window surround for fixed and drop-down windows. The fixed window has a much larger barrel radius of curvature than the drop-down window and the inclusion of the fixed window reduces the chord length of the drop-down window between a beltline of the motor vehicle and a lower edge of the fixed window. This combination allows the use of more tumblehome on the motor vehicle without needing to increase the thickness of the lower part of the side door in order to accommodate the drop-down window when it is lowered.

20 Claims, 17 Drawing Sheets

(56) References Cited

U.S. PATENT DOCUMENTS

| | | | |
|---|---|---|---|
| 5,083,832 A * | 1/1992 | Ohya | 296/146.2 |
| 5,495,693 A * | 3/1996 | Tiesler | 49/502 |
| 7,175,226 B1 * | 2/2007 | Queener | 296/146.16 |
| 2008/0271379 A1 * | 11/2008 | Rietdijk et al. | 49/142 |
| 2012/0139286 A1 | 6/2012 | Zhang et al. | |
| 2015/0028620 A1 * | 1/2015 | Gerhardt et al. | 296/146.2 |

\* cited by examiner

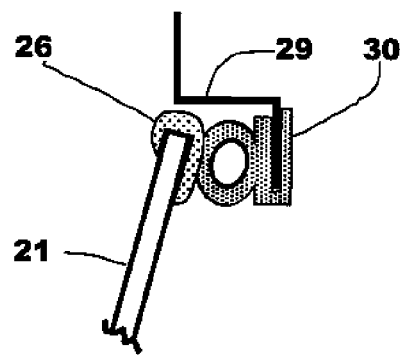
Fig.8e
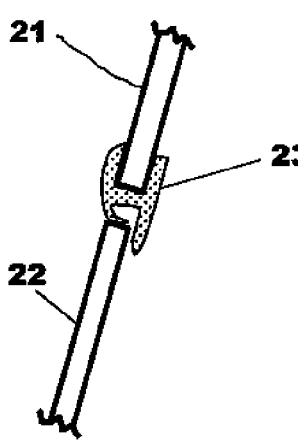 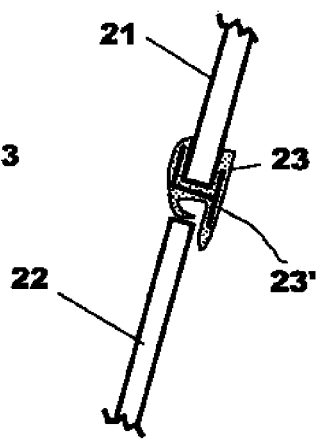 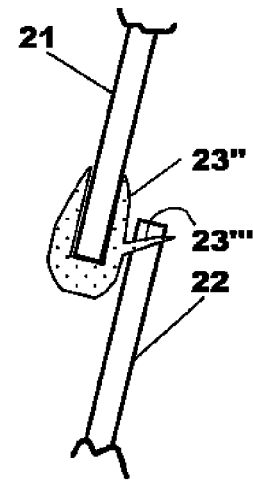
Fig.8f  Fig.8f'  Fig.8f''

MOTOR VEHICLE SIDE DOOR

This invention relates to a motor vehicle and in particular to a side door for a motor vehicle having an inboard leaning glass section also known as a large tumblehome.

BACKGROUND

It is known to provide a side door of a motor vehicle with a moveable side window often referred to as a 'drop-down window' or 'drop-glass'. Increasingly the amount of tumblehome used for a motor vehicle is being increased for design and/or aerodynamic purposes. The use of a large tumblehome creates packaging problems for a drop-down window if a side window having a conventional curvature is used.

Automotive glazing on the side of a vehicle body consists of a number of elements that span the length of the side of the body. The glazing is usually designed using CAD software with the aim of harmonizing the reflections and enabling dropping of glazing elements to open the windows.

The final shape usually consists of a substantially horizontal arc of a suitable curvature along the beltline of the motor vehicle and a substantially vertical arc of suitable curvature near the B-pillar. These arcs are then swept into a 3D surface. If both arcs were of the same radius and had the same origin, the resulting surface would be a ball but in practice the radii are significantly different so that the resulting surface is usually barrel shaped. Therefore, the windows forming the side portions of the glasshouse each has an outer surface that is curved in two directions that is to say the surface is as though cut from a barrel or prolate spheroid.

The vertical arc is said to have a vertical barrel radius of curvature and is the curvature of a part of a motor vehicle shaped as though cut from a barrel when the part is bisected by a transverse vertical plane through the motor vehicle such as the vertical transverse plane V-V shown on FIG. 1a.

FIG. 3a shows as a chain dotted line the path W1 of a conventional curved side window having a conventional relatively large vertical barrel radius of curvature. When such a side window (not shown) is in a raised or closed position it abuts against part of the structure of the motor vehicle such as a cantrail 29. It will be appreciated that the seals required between the conventional side window and the cantrail 29 have been omitted from FIG. 3a. The outline of a lower part 13 of a side door is shown in outline.

The conventional large vertical barrel radius of curvature window W1 has a chord length C2 above the lower part 13 of the door when in the raised position and an additional chord length C2" (not shown for the window up position) that remains within the lower part 13 of the door to support the window W1. When in the fully lowered position the chord C2 is moved to the position C2' and the chord C2" is as shown.

The width of the lower part 13 of the side door will have a direct effect on the total vehicle width and passenger compartment width. The path W1 of the conventional side window crosses an outer boundary of the lower part 13 of the side door so as to lie a distance "x1" outside the outer boundary of the lower part 13. Therefore it would not be possible to lower the conventional side window along the path W1 unless the outer boundary of the lower part 13 is moved outwardly by a distance greater than "x1". It is undesirable to move the outer boundary of the lower part 13 outwards because this will increase the overall width of the motor vehicle. This is particularly disadvantageous in the case of a compact motor vehicle such as a city car where the overall dimensions of the motor vehicle are critical.

FIG. 3a also shows as a chain dotted line the path W2 of an alternative side window having a smaller vertical barrel radius of curvature of the type required for a motor vehicle with a large tumblehome and having a vertical barrel radius of curvature chosen so as to prevent the path W2 from crossing the outer boundary of the lower part 13. As before, when the alternative side window (not shown) is in a raised or closed position it abuts against the cantrail 29.

The small vertical barrel radius of curvature window W2 has a chord length C3 above the lower part 13 of the door when in the raised position and an additional chord length C3" (not shown for the window up position) that remains within the lower part 13 of the door to support the window. When in the fully lowered position the chord C3 is moved to the position C3' and the chord C3" is as shown.

In this case the smaller vertical barrel radius of curvature results in the path W2 of the alternative side window crossing an inner boundary of the lower part 13 of the side door so that a lower edge of the alternative side window would lie a distance "x2" inside the inner boundary of the lower part 13. Therefore it is not possible to lower the alternative side window along the path W2 unless the inner boundary of the lower part 13 is moved inwardly by a distance greater than "x2". However, moving the inner boundary inwards is undesirable because it will affect the overall width of a passenger compartment of the motor vehicle. This is a particular problem if the motor vehicle is a compact motor vehicle such as a city car which is already likely to have a relatively narrow passenger compartment.

FIGS. 4a and 4b show, in a diagrammatic manner, how the problem of using a large tumblehome presents itself when a motor vehicle has side doors 110 that are thin and very contoured. In the case of compact motor vehicles such as a city car it is desirable to keep the thickness of the side doors 110 as thin as possible in order to maximise internal space while minimising external width of the motor vehicle. It is also common practice on modern motor vehicles to provide a significant concave contour to an outer surface 114 of a lower part 113 of the side door 110 for styling or aerodynamic purposes and to use such a door 110 in combination with a large tumblehome.

It can be seen that with a conventional single drop-down window 121 that has a large vertical barrel radius of curvature to match the tumblehome, the path of the window 121 indicated by the dotted line R-R will cause the window 121 to foul a door lock mechanism 150 and is not contained within the package envelope for the lower part 113 of the side door 110 when the window is lowered.

In FIGS. 5a and 5b a first solution to this problem is shown in which the contoured concave outer surface shown in FIGS. 4a and 4b is replaced by a convex outer surface 114b, where the lock mechanism 150 is moved outwards accordingly, and all other details remain the same. Although with such an arrangement the window 121 will not foul the door lock mechanism 150 and is contained within the package envelope for the lower part 113 of the side door 110 when the window is lowered it is unacceptable for many vehicles because the thickness of the side door is excessive thereby compromising vehicle interior space and the overall width of the motor vehicle. In addition the original contour has been replaced by a bulging convex contour which may not match the styling of the motor vehicle and may not provide the aerodynamic flow required for the motor vehicle.

In FIG. 6 a second solution to the problem set out in FIGS. 4a and 4b is shown. In this case the solution is to reduce the tumblehome so that instead of the drop-down window 121 following the path R-R it follows the path R'-R' thereby enabling the window 121 to be packaged within the lower part 113 of the side door 110. The problem with this solution is that it restricts the choice of tumblehome available to the designer when shaping the character, style and proportion of the vehicle or the engineer when looking to improve the aerodynamic efficiency of the vehicle.

SUMMARY

It is an object of the invention to provide a side door for a motor vehicle having an opening window arrangement that is compatible with concave outer door surfaces and permits the use of a large tumblehome without significantly affecting either the overall width of the motor vehicle or the interior width of a passenger compartment of the motor vehicle.

According to a first aspect of the invention there is provided a motor vehicle side door having a lower part below a beltline of the motor vehicle and an upper part above the beltline of the motor vehicle, the upper part comprising a fixed window, a drop-down window located below the fixed window and a window surround for the fixed and drop-down windows wherein both of the windows when bisected by a common transverse vertical plane of the motor vehicle has a curved cross-section with a respective external convex surface and a radius of curvature of the external convex surface of the fixed window is larger than the radius of curvature of the external convex surface of the drop-down window.

A locus of the radius of curvature of the fixed window and a locus of the radius of curvature of the drop-down window may be positioned such that extended arcs of the fixed and drop-down external convex surfaces do not intersect below a lower edge of the fixed window.

The radius of curvature of the fixed window may be a vertical barrel radius of curvature and the radius of curvature of the drop-down window may be a vertical barrel radius of curvature.

The window surround may include a division bar separating the fixed window from the drop down window.

The division bar may include an internal structural reinforcement member.

The window surround may include a front upright having an integral rigid structural frame member having a lower end fastened to the lower part of the side door and an upper end bonded to a front edge of the fixed window so as to support the fixed window, a rear upright having an integral rigid structural frame member having a lower end fastened to the lower part of the side door and an upper end bonded to a rear edge of the fixed window so as to support the fixed window.

Advantageously, the two structural frame members may extend only part way up the respective front and rear edges of the fixed window.

An inner face of each of the uprights of the window surround may have a stepped portion located at a position above a position where the respective structural frame member ends and the thickness of the window surround above the stepped portion may be significantly less than the thickness of the window surround below the stepped portion.

The thickness of the window surround above the stepped portion may be less than the thickness of the window surround just below the stepped portion by an amount substantially equal to the thickness of the respective structural frame member.

Each of the uprights of the window surround when bisected by a transverse vertical plane of the motor vehicle may have a curved cross-section with an external convex face to match an adjacent part of the motor vehicle and the curvature of an external face of the fixed window may be substantially equal to the curvature of the adjacent external faces of the uprights of the window surround.

The front upright of the window surround may define part of a front glass drop channel and the rear upright of the window surround may define part of a rear glass drop channel and a lateral spacing of the external face of each upright to the respective glass drop channel may vary between an upper end of each glass drop channel and the beltline of the motor vehicle.

The thickness of each of the two uprights may increase towards the beltline of the motor vehicle to accommodate the variation in lateral spacing of the window drop channels.

Preferably, the window surround may be a single integral component and the window surround may be made by an encapsulation process.

According to a second aspect of the invention there is provided a motor vehicle having at least one side door constructed in accordance with said first aspect of the invention.

The motor vehicle may have a body structure defining a door aperture supporting a door seal and the door aperture may be shaped to complement stepped portions of the window surround.

A shoulder width between an outer face of the drop-down window and a shoulder line of the motor vehicle may be greater than the shoulder width between a respective outer face of an adjacent quarter light and the shoulder line of the motor vehicle.

The increased shoulder width may be disguised by a waist seal having a continuous outer edge and a stepped inner edge.

BRIEF DESCRIPTION OF THE DRAWINGS

The invention will now be described by way of example with reference to the accompanying drawing of which:

FIG. 3b is a schematic diagram showing the path of the moveable side window shown in FIG. 1a;

FIG. 7a is a diagrammatic side view on an enlarged scale of the side door shown in FIG. 1a;

FIG. 7b is a diagrammatic view of a fixed window and supporting structural frame forming part of the side door shown in FIG. 7a;

FIG. 8a is a diagrammatic cross-section on the line A-A shown on FIG. 7a;

FIG. 8b is a diagrammatic cross-section on the line B-B shown on FIG. 7a;

FIG. 8c is a diagrammatic cross-section on the line C-C shown on FIG. 7a;

FIG. 8d is a diagrammatic cross-section on the line D-D shown on FIG. 7a;

FIG. 8e is a diagrammatic cross-section on the line E-E shown on FIG. 7a;

FIG. 8f is a diagrammatic cross-section on the line F-F shown on FIG. 7a having aligned fixed and drop-down windows;

FIG. 8f' is a diagrammatic cross-section on the line F-F shown on FIG. 7a showing an alternative construction to the construction shown in FIG. 8f;

FIG. 8f'' is a further diagrammatic cross-section on the line F-F shown in FIG. 7a where the fixed and drop-down windows are offset for improved sealing;

The Figures are provided for explanation only and, in particular, the radii shown are much smaller and produce more severe curvatures than would be used in practice. If real radii were to be used for the figures the resultant arcs would appear as straight lines when drawn to such a small scale.

DETAILED DESCRIPTION

Figure 1A:
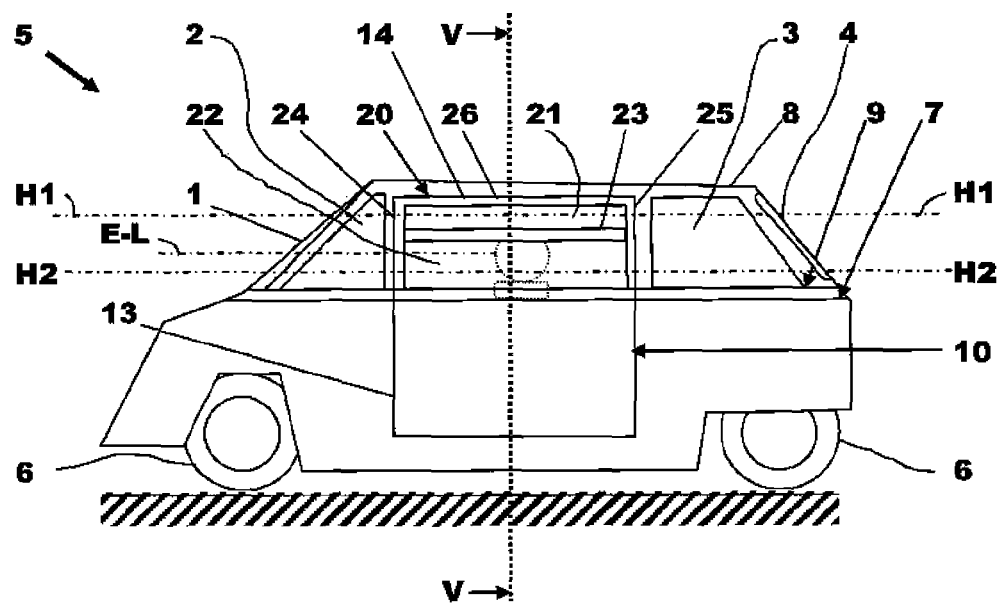
FIG. 1a is a diagrammatic side view of a motor vehicle according to a second aspect of the invention having a side door in accordance with a first embodiment of a first aspect of the invention.
Figure 1B:
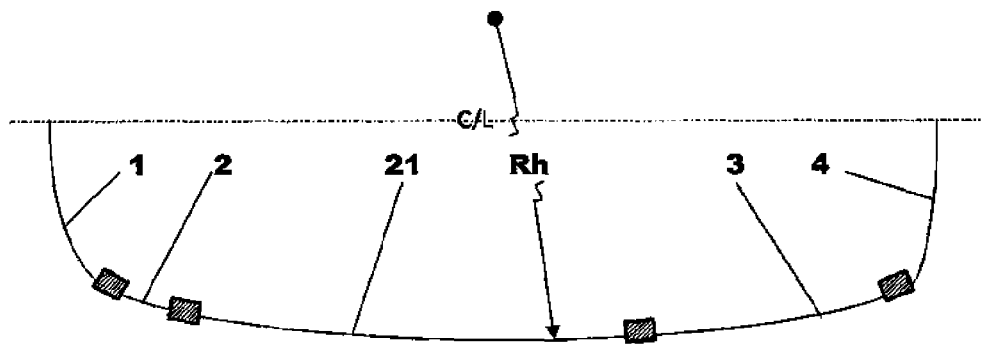
FIG. 1b is a schematic cross-sectional outline of a left hand half of the motor vehicle shown in FIG. 1a on the plane H1-H1.
Figure 1C:
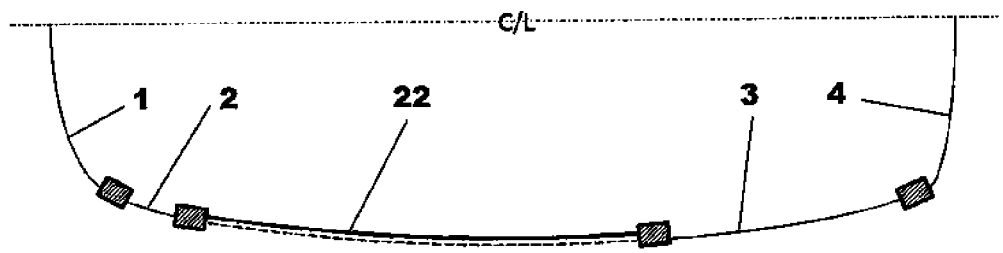
FIG. 1c is a schematic cross-sectional outline of a left hand half of the motor vehicle shown in FIG. 1a on the plane H2-H2.
Figure 2:
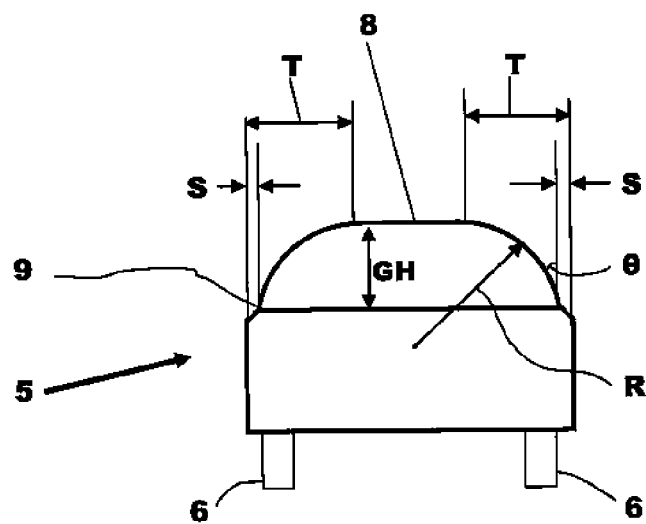
FIG. 2 is a schematic view of an outline of the motor vehicle shown in FIG. 1a on a vertical transverse plane V-V shown on FIG. 1.

With particular reference to FIGS. 1a-2 there is shown a motor vehicle 5 having in this case four road wheels 6, a body structure including a roof 8 and a source of motive power (not shown). The motor vehicle 5 has a pair of identical side doors 10 of which only the left hand side door 10 is shown and described. The motor vehicle 5 has a glasshouse above a beltline 9 of the motor vehicle 5 and a feature line or shoulder line 7 on each side of the motor vehicle 5 located below the beltline 9. The glasshouse has a number of windows including a pair of side windows 21, 22 forming part of the side door 10, a windscreen 1, a front quarter light 2, a rear quarter light 3 and a rear screen 4.

The side door 10 has a lower part 13 below the beltline 9 of the motor vehicle 5 and an upper part 14 above the beltline 9 of the motor vehicle 5. The upper part 14 of the side door 10 therefore forms part of the glasshouse of the motor vehicle 5.

The motor vehicle 5 has a very large tumblehome as is best understood with reference to FIG. 2. 'Tumblehome' is used in respect of automotive technology to describe how much narrower the roof 8 is than the width of the motor vehicle 5 at the beltline 9. The amount of tumblehome is a factor of two elements. Firstly, the angle of the pillars and the side glass from the perpendicular at the beltline of a motor vehicle and, secondly, the vertical barrel radius of curvature of the side glass.

In FIG. 2 the tumblehome angle is designated the reference sign θ and the vertical barrel radius of curvature is designated "R". In combination these result in an inward curvature or tumblehome of "T" per side so that the total reduction in the width of the roof 8 compared to the width of the motor vehicle 5 at the beltline 9 is equal to "2T". It will be appreciated that as the angle θ is increased and/or the barrel radius of curvature "R" is reduced the amount of tumblehome is increased. It will be appreciated that for a given vehicle width and roof width, the tumblehome T and a shoulder line width "S" can be traded off against one another to vary the design profile of a vehicle.

So far reference has only been made to the vertical barrel radius of curvature "R" which is the curvature of a part of the motor vehicle 5 when cut by a transverse vertical plane through the motor vehicle 5 such as the vertical transverse plane V-V shown on FIG. 1a.

A second barrel radius is also present which is termed a horizontal barrel radius of curvature and is the curvature of a part of the motor vehicle 5 when cut by a transverse horizontal plane through the motor vehicle 5 such as the horizontal transverse planes H1-H1 and H2-H2 shown on FIG. 1a.

Figure 3A:
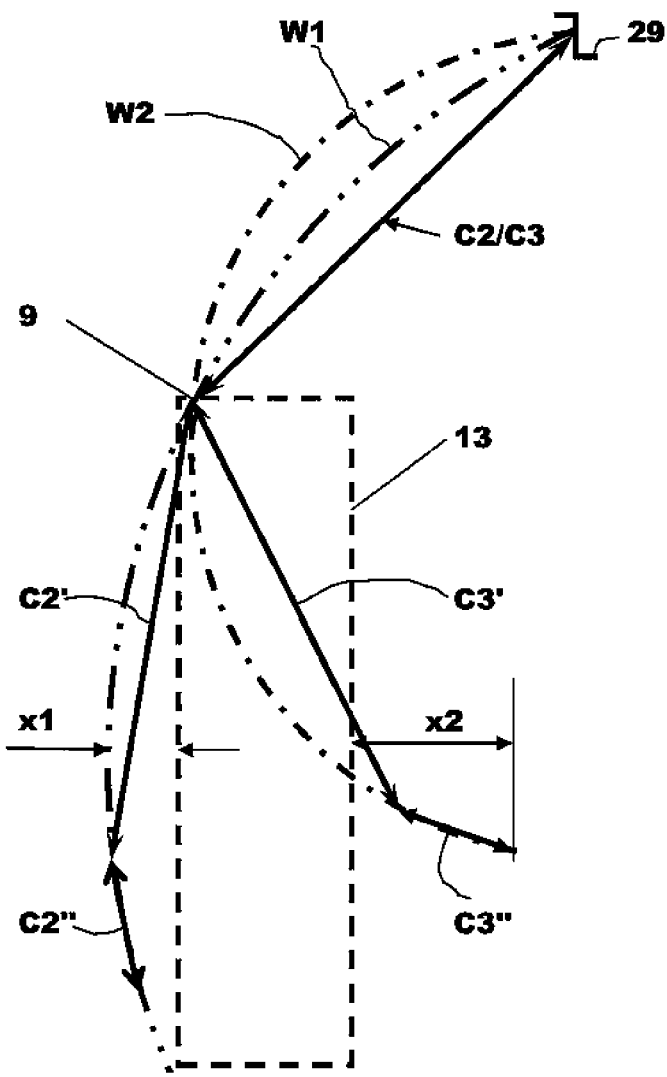
FIG. 3a is a schematic diagram showing the paths of prior art side windows.
Figure 8A:
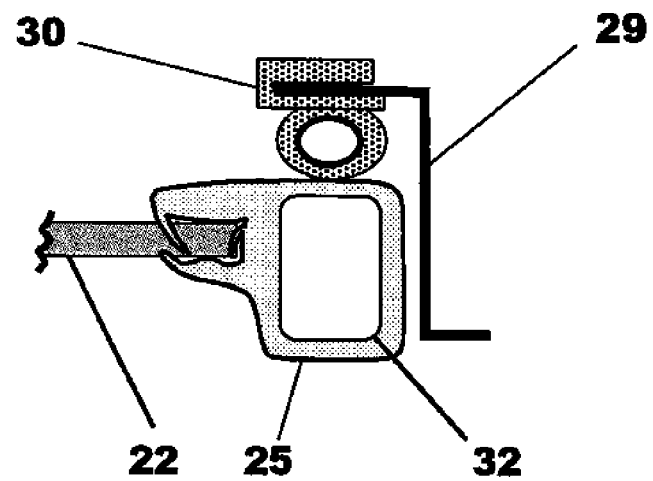
Figure 8B:
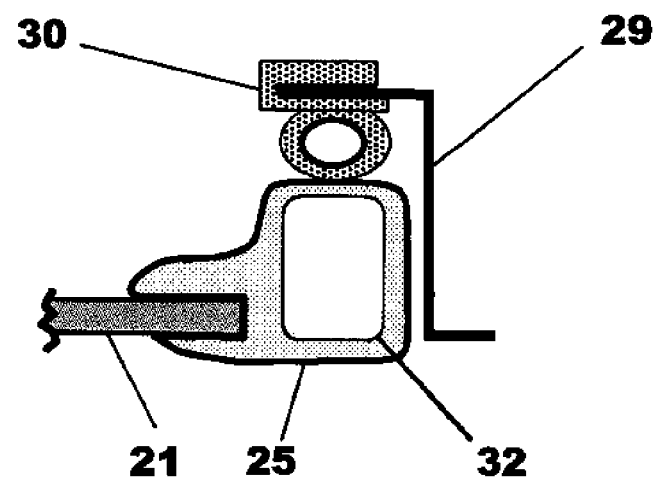
Figure 8C:
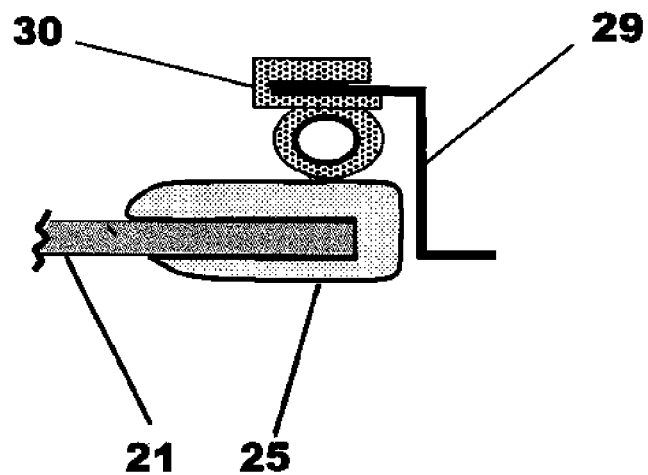
Figure 9A:
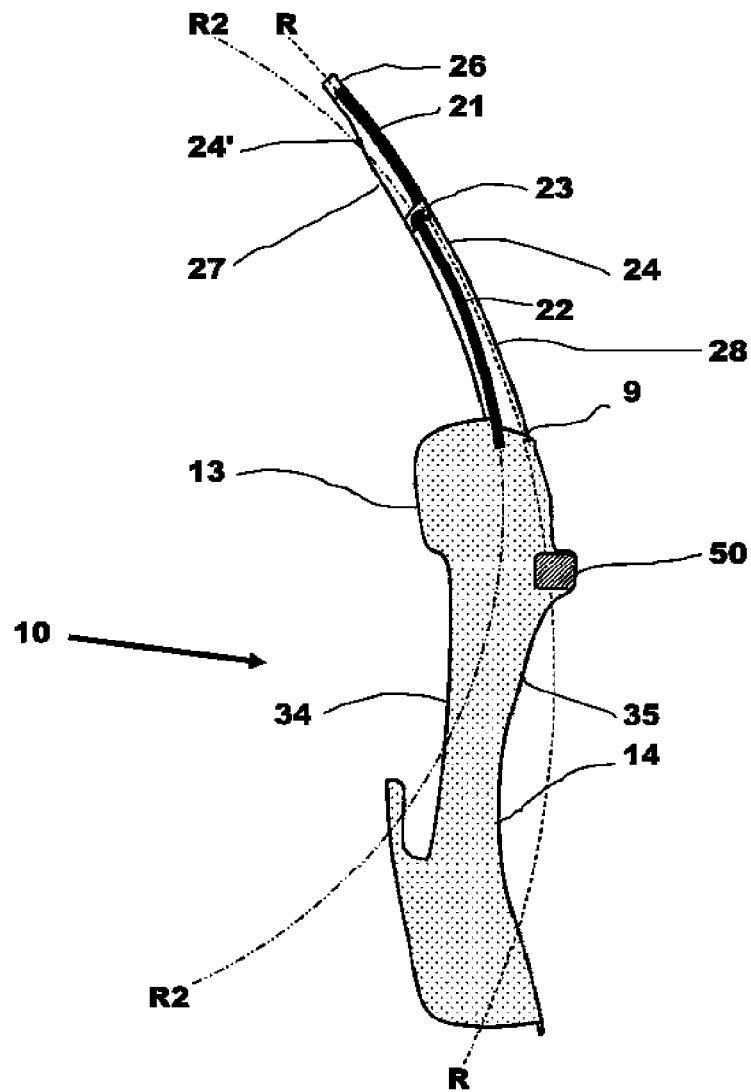
FIGS. 9a and 9b are diagrammatic end views of the side door shown in FIGS. 1a and 7a in the direction of the arrow G on FIG. 7a showing a drop-down window having a small vertical barrel radius of curvature in raised and lowered positions according to the first embodiment of the first aspect of the invention.
Figure 9B:
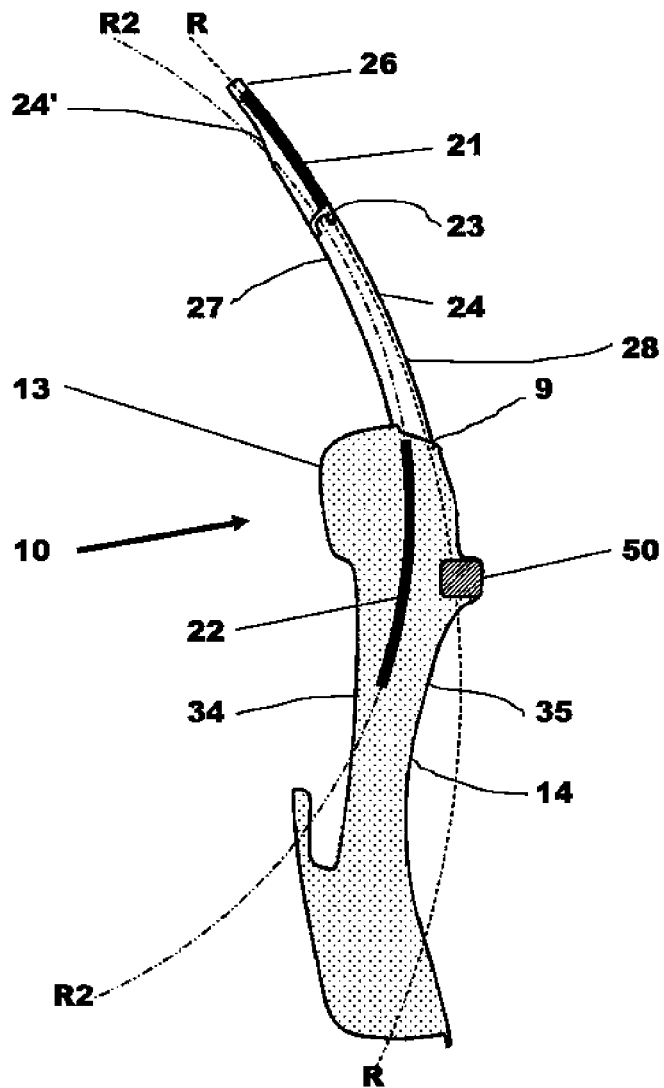

This horizontal barrel radius Rh is shown on FIG. 1b as applied to a fixed window 21 of the side door 10. However, the quarter lights 2, 3 and a drop down window 22 also have a corresponding horizontal barrel radius. The fixed window 21 and the quarter lights 2, 3 all share a common horizontal barrel radius of curvature. If the interface of the windows 21 and 22 at the division bar 23 is such that the windows abut as shown in FIGS. 8f and 8f', then the windows 21 and 22 will have a common horizontal barrel radius and the small offset visible on FIG. 1c between the position of the drop down window 22 and a dotted line indicating extensions of the curvature used for the adjacent quarter lights 2, 3 will be slightly discontinuous. If the interface of the windows 21 and 22 is overlapping or offset as shown in FIGS. 3c, 9a and 9b, then the drop down window 22 will have a marginally smaller horizontal barrel radius of curvature than the fixed window 21 and the adjacent quarter lights 2, 3 in which case the gap can be continuous.

A surface defined by a vertical barrel radius of curvature is said to have a 'vertical barrel curvature' and a surface defined by a horizontal barrel radius of curvature is said to have a 'horizontal barrel curvature'.

Figure 3B:
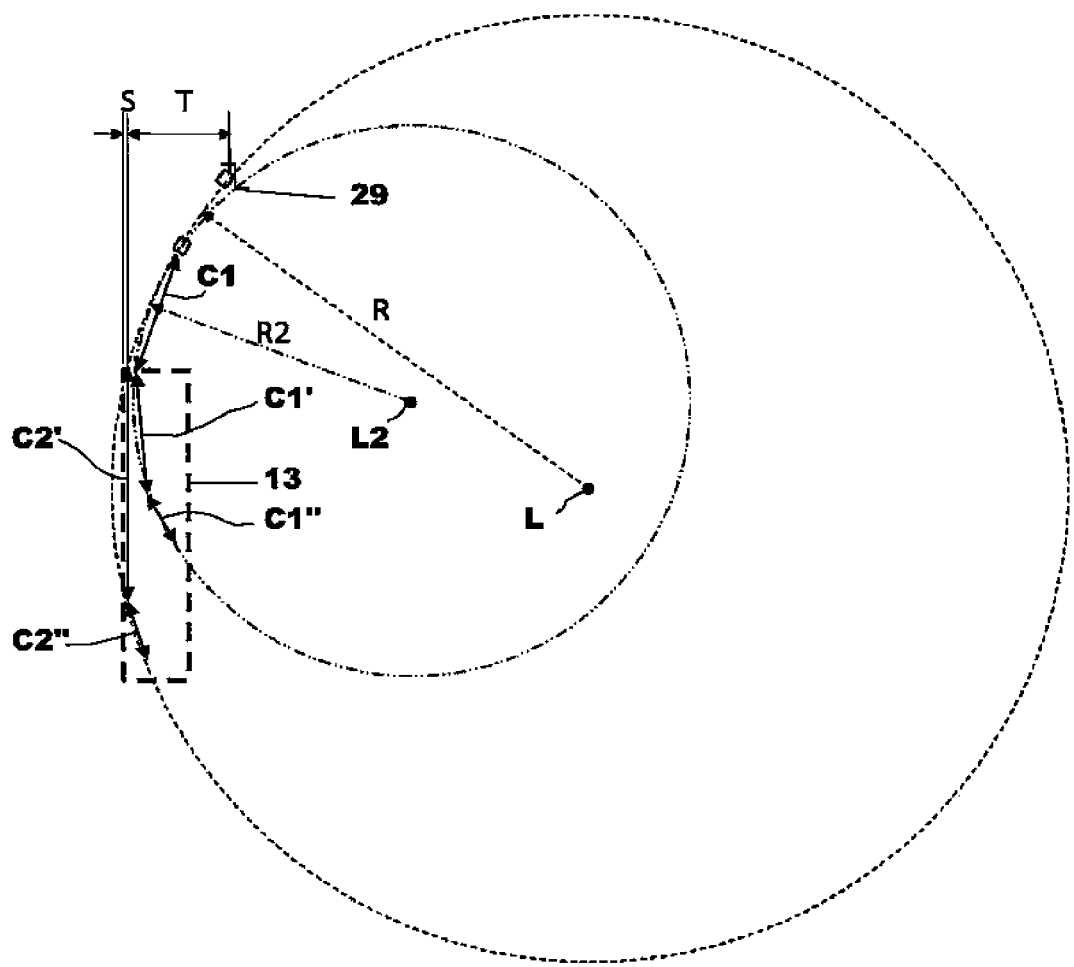
Figure 3C:
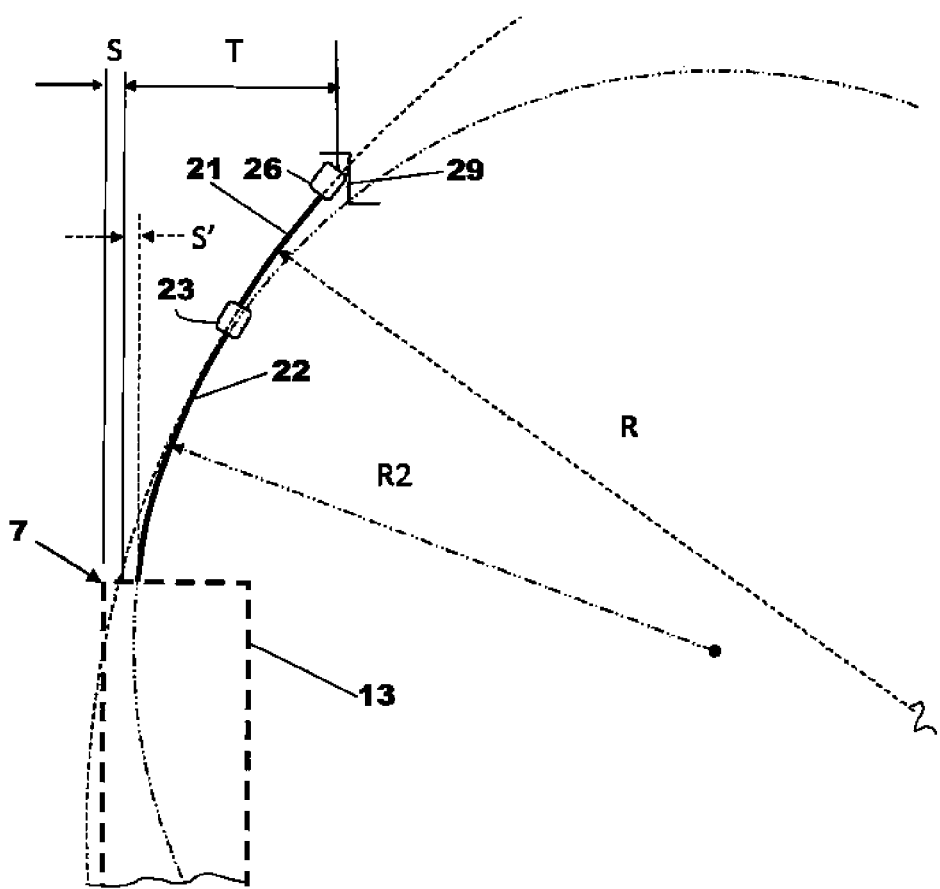
FIG. 3c is a schematic diagram similar to FIG. 3b showing on an enlarged scale the path of the moveable side window.

Referring now to FIG. 3b there is shown in a schematic form the side door 10. A fixed window 21 is located above a drop-down window 22 and is separated from the drop-down window 22 by a division bar 23 forming part of an opaque window surround 20. The window surround 20 co-operates at an upper end with a cantrail 29 forming part of the body structure of the motor vehicle 5 via a seal (not shown on FIG. 3b).

The drop-down window 22 has a vertical barrel radius of curvature R2 and a chord length C1 between the beltline 9 and its upper edge when it is in a raised position. The chord length C1 is very important because it is this chord length plus a chord length C1" that must be housed within the lower part 13 of the side door 10 when the drop-down window 22 is in a fully lowered position as indicated on FIG. 3b by the chord length C1'. A comparison of the chord length C1' and C1" with the corresponding chord length C2' and C2" illustrates one advantage of the invention namely that the chord length of glass to be accommodated in the lower part 13 of the side door 10 is considerably less for the embodiment shown in FIG. 3b than is the case if a full height drop-down window as shown in FIG. 3a is used.

It will be appreciated that a chord length from the beltline 9 to the position where the window surround 20 contacts the cantrail 29 is substantially the same for the embodiment shown in FIG. 3b as the chord length C2/C3 shown on FIG. 3a.

It will be appreciated that both of the windows 21, 22 when bisected by a common transverse vertical plane such as the vertical plane V-V of the motor vehicle 5 will have a curved cross-section with a respective external convex surface. A vertical barrel radius of curvature R of the external convex surface of the fixed window 21 is larger than the vertical barrel radius of curvature R2 of the external convex surface of the drop-down window 22. That is to say, the amount of vertical barrel curvature of the fixed window 21 is less than the amount of vertical barrel curvature of the drop-down window 22 or, to put it another way, the drop-down window 22 is more curved than the fixed window 21.

The fixed window 21 has a vertical barrel radius of curvature R that is substantially the same as that for the other side windows 2, 3 of the motor vehicle 5 and for the adjacent window surround 20 that matches the adjacent side windows 2, 3. It will be noted that the locus L2 of the vertical barrel radius of curvature R2 of the drop-down window 22 is located in a different position to the locus L of the vertical barrel radius of curvature R. Also the vertical barrel radius of curvature R2 is much smaller than the vertical barrel radius of curvature R.

Also the locus L of the radius of curvature of the fixed window 21 and the locus L2 of the radius of curvature of the drop-down window 22 are positioned such that extended arcs of the fixed and drop-down external convex surfaces do not intersect below a lower edge of the fixed window 21. That is to say no part of the drop-down window 22 ever crosses outside the arc defined by the vertical barrel radius of curvature R.

In FIG. 3c the position where a window having a vertical barrel radius of curvature R would enter the lower part 13 of the side door 10 is spaced a distance S from the shoulder line 7 of the motor vehicle 5. The use of a smaller vertical barrel radius of curvature R2 for the drop-down window 22 has the effect of moving the position where the drop-down window 22 enters the lower part 13 of the side door 10 inboard and away from the shoulder line 7 of the motor vehicle 5 by an additional distance S' compared to the position where a window having a vertical barrel radius of curvature R would enter the lower part 13 of the side door 10.

Figure 3D:
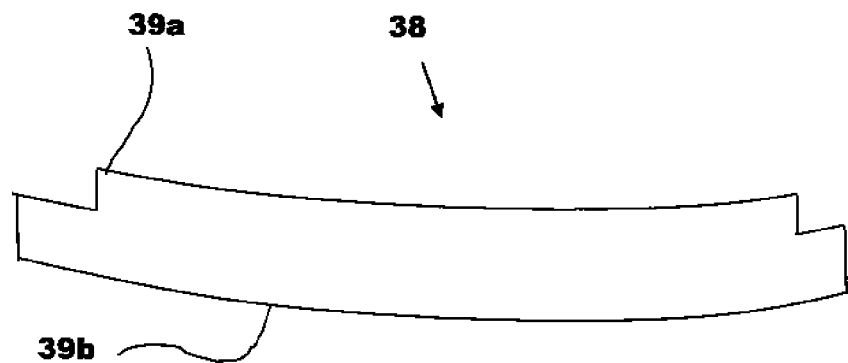
FIG. 3d is a schematic plan view of a waist seal for a side window constructed in accordance with the invention.

This additional distance S' is filled by a waist seal 38 having a stepped inner edge 39a as shown in FIG. 3d. An outer edge of the waist seal 39b has a continuous curved edge of the same curvature as the adjacent seals used for the quarter lights 2, 3 so as to produce the appearance of a continuous uniform beltline.

Figure 3E:
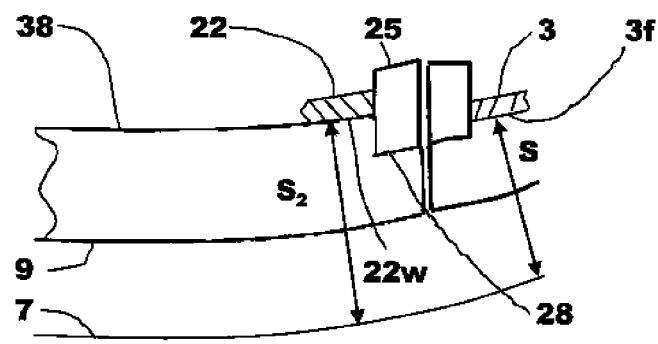
FIG. 3e is a plan schematic diagram showing the relative positions of a drop-down window according to the invention and a rear quarter light at a beltline of the motor vehicle.

FIG. 3e shows how the waist seal 38 disguises the position of the drop-down window 22 compared to the position of the adjacent quarter lights 2, 3.

With reference to FIGS. 3c and 3e it can be seen that a shoulder width S2 between an outer face of the drop-down window 22 and a shoulder line 7 of the motor vehicle 5 is greater than the shoulder width S between a respective outer face 3f of an adjacent quarter light 3 and the shoulder line 7 of the motor vehicle 5 by a distance S'. This is due to the smaller vertical barrel radius of curvature R2 used for the drop-down window 22.

Therefore by using two side windows instead of a single drop-down window and using a smaller vertical barrel radius of curvature it is easier to accommodate the drop-down window 22 within the lower part 13 of the door because the total chord length (C1'+C1") is reduced compared to a case where a full height window is used. The use of two side windows also enables the drop-down window 22 to have a much smaller vertical barrel radius of curvature to which is required if a large amount of tumblehome is present on the motor vehicle 5.

Referring now to FIGS. 1a, 2, 3b to 3e and 7a to 9b, the window surround 20 is in this case opaque and is made from EPDM by an encapsulation process.

Encapsulation is a process by which a plastic frame or surround is formed around a glass panel by injecting a polymer or plastic material onto a rim of the glass panel in a mould. Three materials are commonly used in such an encapsulation process depending upon the requirement for the finished product theses are Polyurethane (RIM), Thermoplastic Elastomers (TPE/PVC) and Thermoset rubber (EPDM).

The window surround 20 is a single integral component comprising a number of features, the division bar 23, a front upright 24, a rear upright 25 and a top rail 26 and tubular structural members 31, 32. The rigid tubular structural frame members 31 32, are over moulded with the EPDM forming the front and rear uprights 24 and 25 so as to form an integral part of the window surround 20.

The division bar 23 separates an upper window aperture in which is mounted the fixed window 21 from a lower window aperture slidingly supporting the drop down window 22. The division bar 23 is positioned above an eye-line (E-L on FIG. 1) of a driver of the motor vehicle 5 when the door 10 is fitted to the motor vehicle 5. By locating the division bar 23 above the eye line E-L of the driver the division bar 23 is less noticeable to the driver. It will be appreciated that the eye line E-L of a driver of the motor vehicle 5 will depend upon their size and the positioning of the seat upon which they sit. European Regulation 77/649/EEC defines a zone "B" below a horizontal plane through V1 (corresponding to the origin of the eye-line E-L on FIG. 1a) and it is desirable if the division bar 23 is located above this zone "B".

As shown in FIG. 8f and FIG. 8f" the division bar 23, 23" is normally made only from the same EPDM material used to form the rest of the window surround 20 of which the division bar 23 forms an integral part. However, if the length of the door 10 is large, it may be necessary to increase the rigidity of the division bar 23 and, in such a case, an internal structural reinforcement member 23' such as shown in FIG. 8f is co-moulded with the division bar 23 as part of the encapsulation process. The structural reinforcement member 23' could be made from any suitable rigid material such as for example and without limitation, steel, aluminium or a fibre reinforced material.

As shown in FIG. 8f"', instead of the fixed and drop-down windows 21 and 22 being aligned at the level of the division bar 23, the division bar 23" encapsulates the fixed window 21 and the drop-down window 22 is offset from the fixed window 21 so as to lie inside of the division bar 23". The division bar 23" includes an integrally formed lip seal 23"' which forms a seal between the division bar 23" and the drop-down window 22.

The window surround 20 includes front and rear uprights 24 and 25. The front and rear uprights 24 and 25 each include a respective rigid tubular structural frame member 31,32 constructed from any suitable material but in this case from steel tube. Each of the structural frame members 31, 32 is encapsulated in EPDM material forming the window surround 20 so as to form an integral structural reinforcement for the window surround 20 in the parts of the window surround 20 where they are present.

Each of the structural frame members 31, 32 is fastened at a lower end to the lower part 13 of the side door 10 and has a respective upper end bonded to front and rear edges 21e and 21s of the fixed window 21 by means of the encapsulation process. A window guide is attached to each of the frame member 31, 32 below the beltline to guide the drop-down window 22. The window guides are not shown but the path followed by the drop-down window 22 is shown as a chain dotted arc R2-R2 on FIGS. 9a and 9b. The arc R-R on FIGS. 9a and 9b represent a continuation of the vertical barrel curvature of the fixed window 21.

The front upright 24 of the window surround 20 defines part of a front glass drop channel and the rear upright 25 of the window surround 20 defines part of a rear glass drop channel. The lateral spacing of the external face 28 of each upright 24, 25 to the respective glass drop channel is not uniform but varies between the location of the upper end of each glass drop channel (adjacent the division bar 23) and the beltline 9 of the motor vehicle 5 to accommodate the difference in vertical barrel radius of curvature between the drop-down window 22 and the two uprights 24, 25. The lateral spacing is greatest near the beltline 9. The thickness of each upright 24, 25 increases towards the beltline 9 of the motor vehicle 5, so as to accommodate the variation in lateral spacing of the respective window drop channels.

In order to reduce the thickness of the window surround 20 in the area abutting the cantrail 29 of the vehicle 5 to permit greater tumblehome without encroaching on the lateral headroom of the occupants, another advantageous aspect of this invention is that the two structural frame members 24, 25 extend only part way up the front and rear edges 21e, 21s of the fixed window 21 so that an upper edge 21u of the fixed window 21 is self-supporting and provides support for the top rail 26 of the window surround 20.

Each of the front and rear uprights 24 and 25 of the window surround 20 has a stepped portion 24', 25' located at a position above the position where the respective structural frame member 31, 32 ends. The thickness of the window surround 20 above the stepped portions 24' 25' is significantly less than the thickness of the window surround 20 below the stepped portions 24', 25' (See FIGS. 8d, 9a and 9b) by an amount substantially equal to the thickness of the structural frame member 31, 32 which are no longer present.

The stepped portions 24' and 25' are formed by steps in an internal surface 27 of the window surround 20 and, in particular, by a respective step in an internal surface of each of the front and rear uprights 24, 25.

Figure 8D:
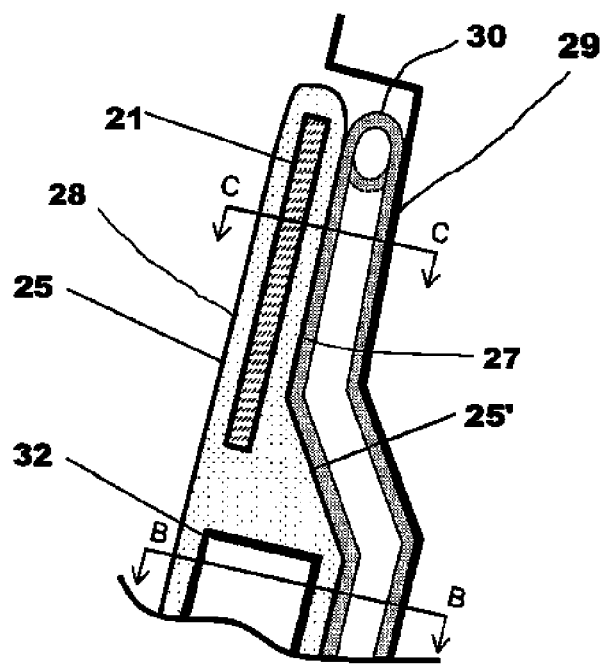

The reduced thickness of the window surround 20 at the top end of the upper part 14 can best be seen in FIGS. 8d and 8e where the thickness of the top end of the upper part 14 of the door 10 comprises only of the thickness of the top rail 26.

The termination of the structural frame members 31, 32 before reaching the upper edge 21u of the fixed window 21 is particularly advantageous because it enables a top end of the upper part 14 of the door 10 such as the top rail 26 and the upper ends of the front and rear uprights 24 and 25 to be made much thinner than they would otherwise be.

It will be appreciated that the top rail 26 can be comprised only of the EPDM encapsulation material.

Therefore, because, the window surround 20 includes no structural reinforcement above the top ends of the two structural frame members 31, 32, any forces imparted to the top rail 26 of the window surround 20, such as seal pressure, are therefore transmitted via the fixed glass 21 to the structural elements 31,32.

A respective cut-out 21c, 21d is present in the front and rear edges 21e and 21s of the fixed window 21 to accommodate the upper ends of the structural frame members 24, 25. The cut-outs 21c, 21d enable the structural frame members 24, 25 to be bonded to the front and rear edges 21e, 21s of the fixed window 21 without increasing the overall length of the upper part 14 of the door 10.

Because the top end of the upper part 14 of the door 10 is much thinner than would be the case if the front and rear structural frame member 31, 32 extended to the upper edge 21u of the fixed window 21 this enables a cooperating part of a door frame 19 of the motor vehicle 5 to be positioned further away from a longitudinal centre line of the motor vehicle 5. Therefore for a cantrail having fixed dimensions, because the cantrail can be positioned further from the centre line of the motor vehicle 5, an inner surface of the cantrail will also be positioned further from the centre line of the motor vehicle 5. This has the effect of increasing lateral head room for an occupant of the motor vehicle 5 which is important because, as already referred to, a motor vehicle having a large amount of tumblehome will have a roof of reduced width compared to a motor vehicle having less tumblehome and so the lateral headroom is likely to be reduced.

By using a door frame 19 shaped to complement the stepped portions 24', 25' of the window surround 20 it is possible to use a conventional bulb sealing ring 30 around the door aperture in which the side door 10 is fitted. Therefore no special seals are required for a side door 10 constructed in accordance with this invention. This is advantageous because special seals are more expensive than a conventional bulb sealing ring because they have to be fabricated from individual shot mouldings, each requiring dedicated tooling.

The fixed and drop-down windows 21 and 22 both have an external convex vertical barrel curvature and the vertical barrel radius of curvature of the fixed window 21 is larger than the vertical barrel radius of curvature of the drop-down window 22. This is because a smaller vertical barrel radius of curvature is required for the drop-down window 22 in order for it to be stowed in the lower part 13 of the door 10 without requiring the thickness of the lower part 13 of the door 10 to be increased. Increasing the thickness of the lower part 13 of the door 10 could result in an increase in total vehicle width, a reduction in passenger compartment width or both and so is disadvantageous especially in the case of a compact automobile such as a city car.

However, the front and rear uprights 24 and 25 of the window surround 20 each has an external face 28 with a convex vertical barrel curvature chosen to match and blend with the surfaces of the motor vehicle 5 adjacent to it when the door 10 is closed. Therefore the vertical barrel radius of curvature of the fixed window 21 is preferably substantially equal to the vertical barrel radius of curvature of the external faces 28 of the front and rear uprights 24 and 25 of the window surround 20. That is to say, each of the uprights 24, 25 of the window surround 20 when bisected by a transverse vertical plane V-V of the motor vehicle 5 has a curved cross-section with an external convex face 28 to match an adjacent part 3 of the motor vehicle 5 and the curvature of an external face of the fixed window 21 is substantially equal to the curvature of the adjacent external faces 28 of the uprights 24, 25 of the window surround 20.

It will be appreciated that there will be a small difference in radius due to the thickness of the respective upright 24, 25 between an outer surface of the fixed window 21 and the outer surface of the respective upright 24, 25 adjacent the fixed window 21. However, this difference is in the order of 0.15% and so the respective radii can be assumed to be substantially the same.

This matching of curvatures is required in order to enable the top part of the window surround 20 to be made as thin as possible which, as previously described, provides more lateral headroom and so is advantageous. If the radius of curvature used for the fixed window 21 is significantly different than the radius of curvature of the external face 28 of the window surround 20 then the thickness of the window surround 20 in the region of the fixed window 21 would need to be increased to accommodate the differing radii.

Typically, the fixed window 21 has a vertical barrel radius of curvature in the range 1.0 m to 2.0 m but the radius could be any suitable radius to suit the curvature of the external face 28 of the window surround 20 in the region adjacent the fixed window 21. The drop-down window 22 requires a smaller vertical barrel radius of curvature in order to permit the drop-down window 22 to fit in the lower part 13 of the door 10 and so typically the vertical barrel radius of curvature will be less than 1.0 m. In one embodiment of the invention the fixed window 21 had a vertical barrel radius of curvature of 1.35 m and the drop-down window 22 had a vertical barrel radius of curvature of 0.6 m.

With particular reference to FIGS. 9a and 9b the side door 10 is shown having an undercut concave outer surface 35 which is increasingly used in modern vehicle design to disguise the visual mass of a vehicle. The side door 10 is also to have an internal depression 34 to allow a stowage pocket to be formed within the overall thickness of the door 10.

It can be seen that the external surface 28 of the uprights 24, 25 of the window surround 20 which follow the arc R-R is markedly different from the path R2-R2 of movement of the drop-down window 22. However, this difference is accommodated by having uprights 24, 25 that are thicker at the beltline 9 of the door 10 than they are at a top edge of the door 10. The difference in vertical barrel radii between the drop-down window 22 and the external surface 28 of the window surround 20 is partially disguised by the opaque nature of the window surround 20 and by the waist seal 38 as shown in FIGS. 3d and 3e.

Figure 4A:
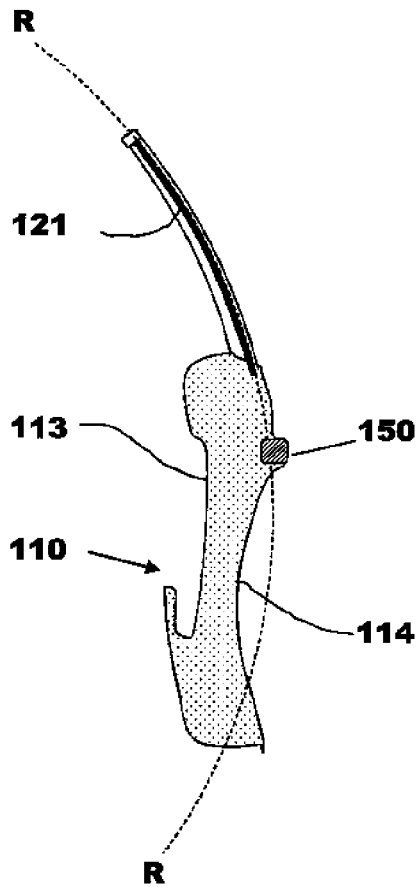
FIGS. 4a and 4b are diagrammatic end views of a thin contoured side door showing the problem as it relates to such a side door with a drop-down window having a large vertical barrel radius of curvature in raised and lowered positions.
Figure 4B:
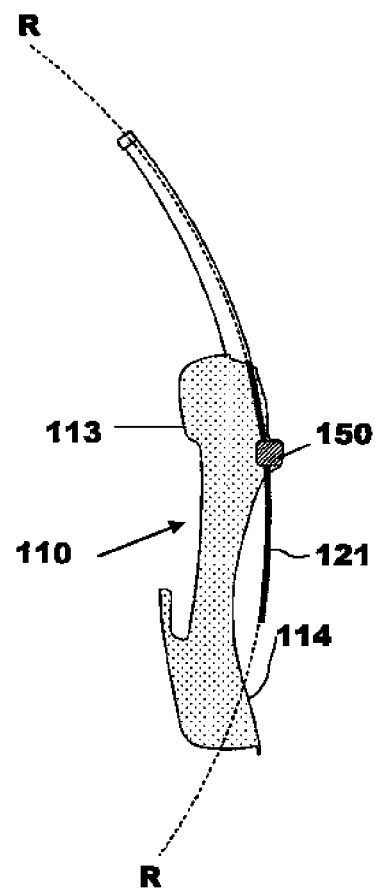
Figure 5A:
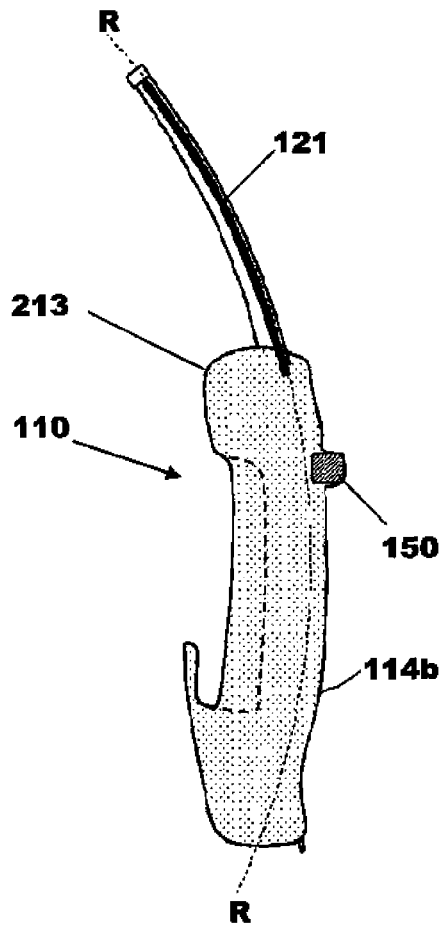
FIGS. 5a and 5b are views similar to FIGS. 4a and 4b showing one potential solution to the problem.
Figure 5B:
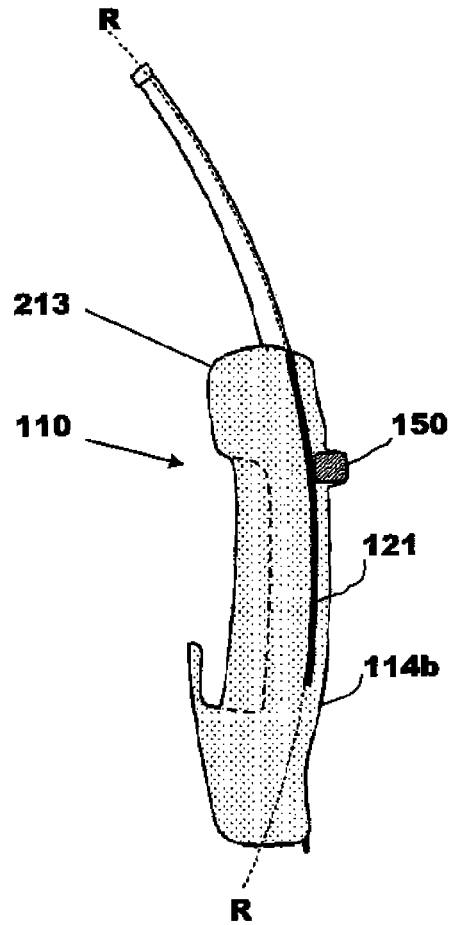
Figure 6:
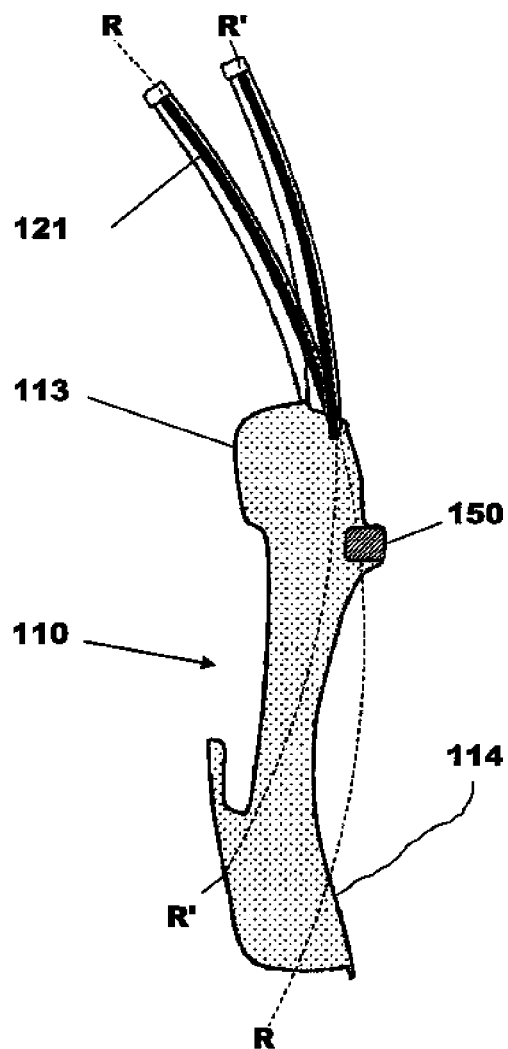
FIG. 6 is a view similar to FIG. 4a showing an alternative solution to the problem.
Figure 7A:
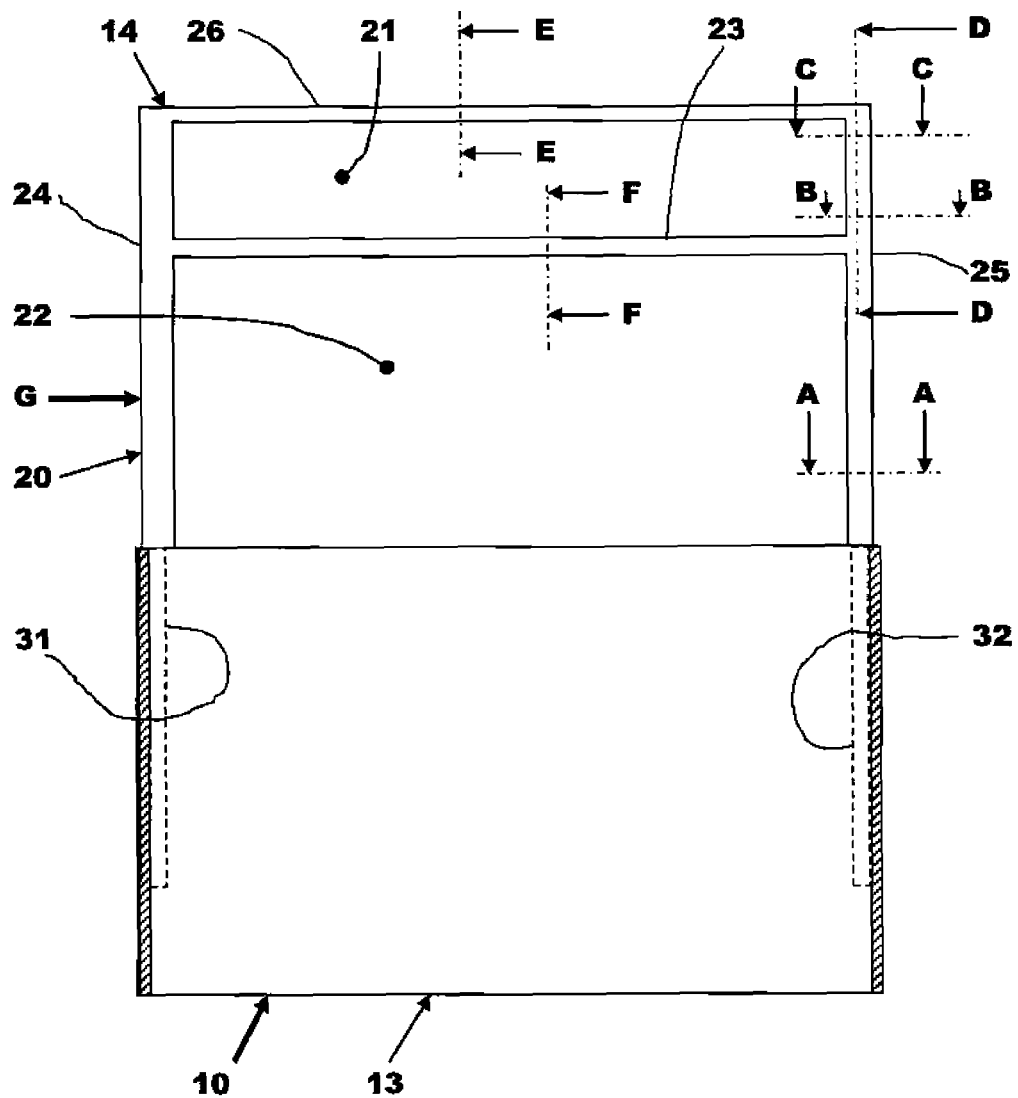
Figure 7B:
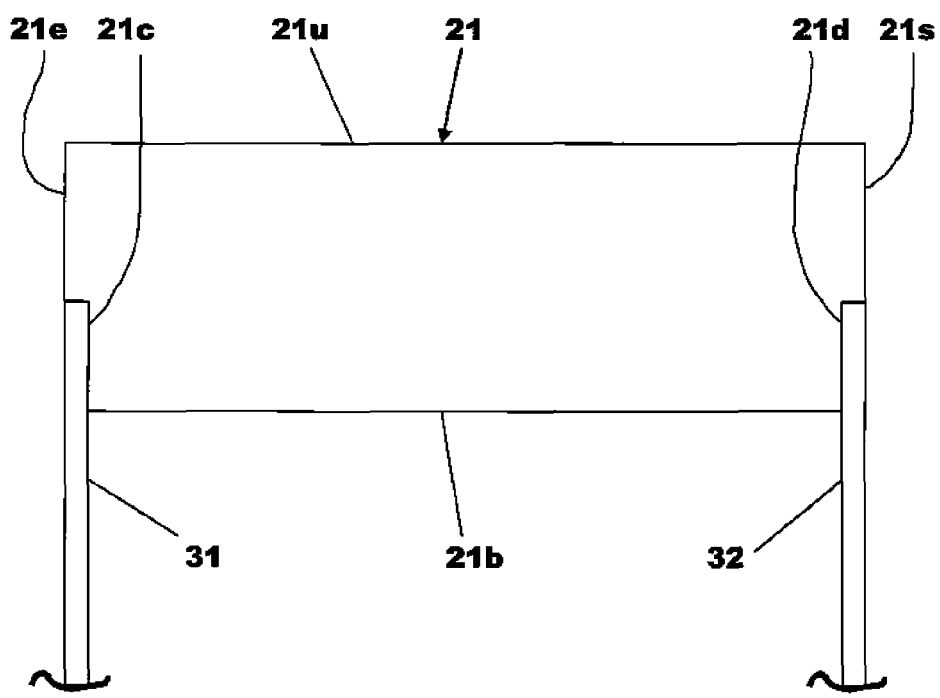

The use of a smaller than usual vertical barrel radius of curvature for the drop-down window 22 permits the thickness of the lower part 13 of the door 10 to be reduced and also allows the use of strong styling features such as, for example, a coke bottle (registered trade mark) shaped exterior panel 14 having a concave outer surface 35. Even with such a styling feature the drop-down window 22 can, as shown in FIG. 9b, be fully lowered without it interfering with the exterior panel 14 of the lower part 13 of the door 10, an interior panel 15 of the lower part of the door 10 or a door lock mechanism 50. Contrast this with the situation using the same door profile but a full length drop-down window 121 having a large vertical barrel radius of curvature shown in FIG. 4b where the drop-down window 121 cannot fit within the door envelope.

Figure 11:
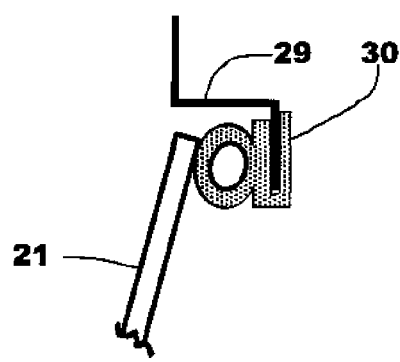
FIG. 11 is a cross section on the line K-K on FIG. 10.
Figure 10:
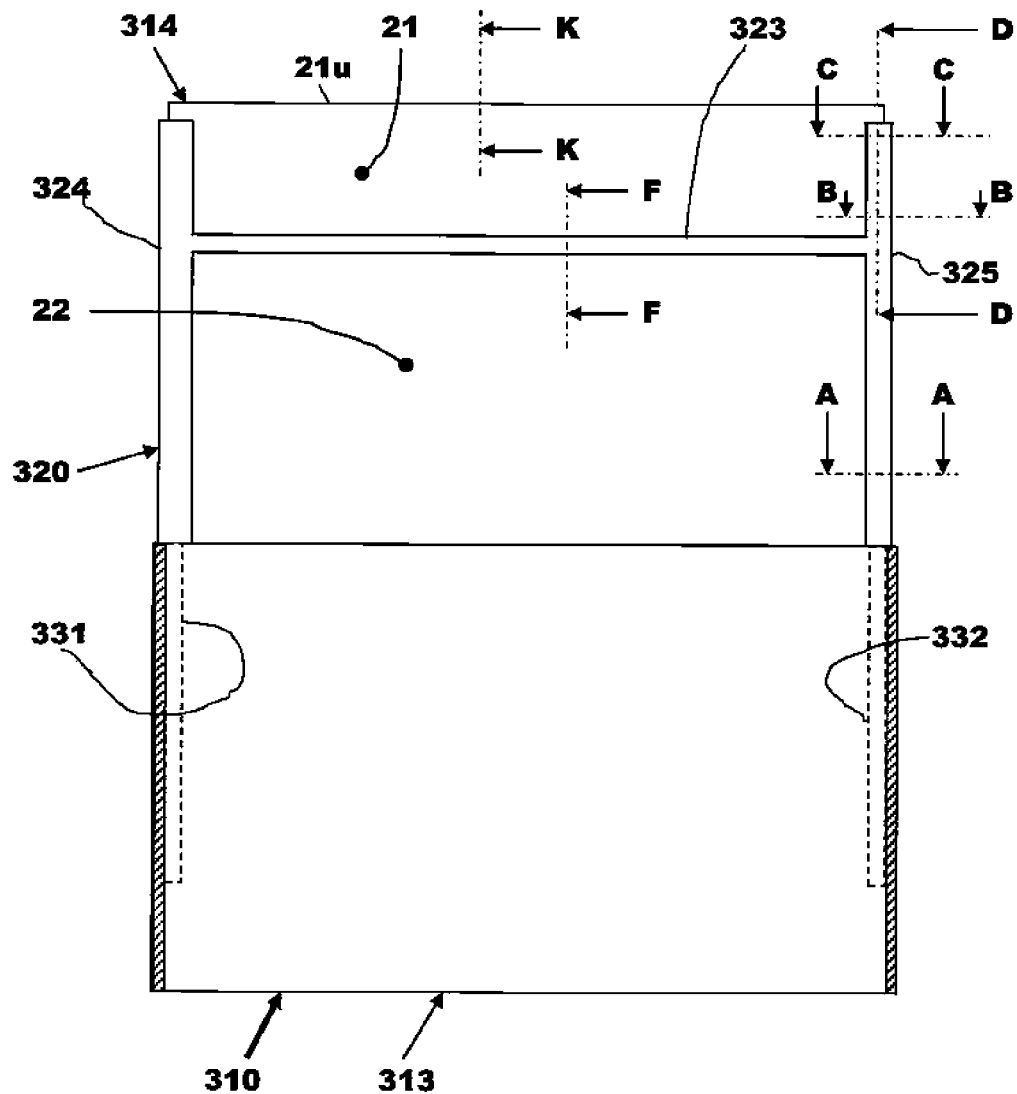
FIG. 10 is a view similar to FIG. 7a but showing a second embodiment of a side door according to the first aspect of the invention.

FIGS. 10 and 11 show two views of a second embodiment of a side door for a motor vehicle which in most respects is identical to that previously described and for which like parts have the same reference numbers. The only significant difference is that in the case of this second embodiment there is no top rail, the front and rear uprights 324,324 for parts of the window support 320 terminate before they reach the top edge 21u of the fixed window 21. The sections A-A, B-B, C-C D-D, and F-F are the same as those for the first embodiment shown in FIGS. 8a to 8d and 8f to 8f. The section E-E is replaced by a section K-K shown in FIG. 11 which replaces the cross-section shown in FIG. 8e.

It will be appreciated that it would be possible to construct either of the two embodiments of window surround from a number of separate components joined together to form the window surround rather than as a single component formed by an encapsulation process but encapsulation is the preferred choice due to the greater component accuracy obtainable and the lower assembly costs associated with this construction.

Although the invention has been described with reference to its use on a side door of a two door vehicle it will be appreciated that it could be applied with equal advantage to front or rear doors of a four door motor vehicle.

Therefore, the invention allows the use of a large tumble-home on a thin highly contoured side door without affecting the thickness of the door thereby maximising interior space and minimising the external width of the motor vehicle.

Therefore in summary the invention provides a number of features. Firstly, where the tumblehome angle at the vehicle beltline is sufficiently discontinuous to the door curvature not to be able to drop a conventional window and/or the lower part of the door is shaped sufficiently not to package a conventionally shaped window drop-glass, a window can be fully dropped into such a vehicle door by increasing the vertical barrel curvature of the window by reducing the vertical barrel radius to a radius sympathetic to a tangent arc between the tumblehome and an outer door surface and by splitting the glass horizontally above an eye line of the driver. An upper window remains fixed and a lower window having a shorter chord length and a reduced vertical barrel radius is easier to package in a lower part of the door.

The increased curvature of the shorter window drop-glass is disguised by the window surround and the contoured weather strip.

A second feature is that by creating an assembly of the fixed upper glass, structural frame members and a horizontal division bar, encapsulating the assembly in an elastomeric material and mechanically fixing the structural frame members to the lower part of the door then an upper horizontal structural frame member at the top of the door is not required if the structural frame members are reduced in height to stop short of the cantrail. This 'semi-frameless' door provides most of the package advantage of a frameless door where it is most required, namely increased lateral head room.

A third feature is that by forming a juggle in the line of the door frame following the shape of the window surround then a conventional bulb seal ring with a conventional shot moulding in the corners can be used to seal the 'semi-frameless' door of this invention to the body.

A fourth feature is that by shaping the fixed glass to continue above the vertical frames and removing glass where the structural frame members are bonded to the fixed window the window surround is stiffened by the encapsulated fixed window sufficiently to provide a continuity of seal pressure, where the EPDM window surround alone would not.

Although the invention is applied to a typical motor vehicle door having a drop-down window having both vertical and horizontal barrel radii of curvature it will be appreciated that it could be used on a drop-down window having only a vertical radius of curvature that is to say one cut from a cylinder and not a barrel.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

What is claimed:

1. A motor vehicle side door having a lower part below a beltline of the motor vehicle and an upper part above the beltline of the motor vehicle, the upper part comprising a fixed window, a drop-down window located below the fixed window and a window surround for the fixed and drop-down windows wherein both of the windows when bisected by a common transverse vertical plane of the motor vehicle have a curved cross-section with a respective external convex surface and a radius of curvature of the external convex surface of the fixed window is larger than the radius of curvature of the external convex surface of the drop-down window.

2. A side door as claimed in claim 1 wherein a locus of the radius of curvature of the fixed window and a locus of the radius of curvature of the drop-down window are positioned such that extended arcs of the fixed and drop-down external convex surfaces do not intersect below a lower edge of the fixed window.

3. A side door as claimed in claim 1 wherein the radius of curvature of the fixed window is a vertical barrel radius of curvature and the radius of curvature of the drop-down window is a vertical barrel radius of curvature.

4. A door as claimed in claim 1 wherein the window surround includes a division bar separating the fixed window from the drop down window.

5. A door as claimed in claim 4 wherein the division bar includes an internal structural reinforcement member.

6. A door as claimed in claim 1 in which the window surround includes a front upright having an integral rigid structural frame member having a lower end fastened to the lower part of the side door and an upper end bonded to a front edge of the fixed window so as to support the fixed window, a rear upright having an integral rigid structural frame member having a lower end fastened to the lower part of the side door and an upper end bonded to a rear edge of the fixed window so as to support the fixed window.

7. A door as claimed in claim 6 wherein the two structural frame members extend only part way up the respective front and rear edges of the fixed window.

8. A door as claimed in claim 7 wherein an inner face of each of the uprights of the window surround has a stepped portion located at a position above a position where the respective structural frame member ends and the thickness of the window surround above the stepped portion is significantly less than the thickness of the window surround below the stepped portion.

9. A door as claimed in claim 8 wherein the thickness of the window surround above the stepped portion is less than the thickness of the window surround just below the stepped portion by an amount substantially equal to the thickness of the respective structural frame member.

10. A door as claimed in claim 6 wherein each of the uprights of the window surround when bisected by a transverse vertical plane of the motor vehicle has a curved cross-section with an external convex face to match an adjacent part of the motor vehicle and the curvature of an external face of the fixed window is substantially equal to the curvature of the adjacent external faces of the uprights of the window surround.

11. A door as claimed in claim 6 wherein the front upright of the window surround defines part of a front glass drop channel and the rear upright of the window surround defines part of a rear glass drop channel and a lateral spacing of the external face of each upright to the respective glass drop channel varies between an upper end of each glass drop channel and the beltline of the motor vehicle.

12. A door as claimed in claim 11 wherein the thickness of the two uprights increase towards the beltline of the motor vehicle to accommodate the variation in lateral spacing of the window drop channels.

13. A door as claimed in claim 1 wherein the window surround is a single integral component.

14. A door as claimed in claim 1 wherein the window surround is made by an encapsulation process.

15. A motor vehicle having at least one side door as claimed in claim 1.

16. A motor vehicle as claimed in claim 15 wherein the motor vehicle has a body structure defining a door aperture supporting a door seal and the door aperture is shaped to complement stepped portions of the window surround.

17. A motor vehicle as claimed in claim 15 wherein a shoulder width between an outer face of the drop-down window and a shoulder line of the motor vehicle is greater than the shoulder width between a respective outer face of an adjacent quarter light and the shoulder line of the motor vehicle.

18. A motor vehicle as claimed in claim 17 wherein the increased shoulder width is disguised by a waist seal having a continuous outer edge and a stepped inner edge.

19. A motor vehicle having at least one side door as claimed in claim 4.

20. A motor vehicle having at least one side door as claimed in claim 6.

* * * * *